US005523040A

United States Patent [19]
Krouskop

[11] Patent Number: 5,523,040
[45] Date of Patent: Jun. 4, 1996

[54] METHOD AND APPARATUS FOR MAKING A CUSTOM SUPPORT

[75] Inventor: Thomas A. Krouskop, Stafford, Tex.

[73] Assignee: Baylor College of Medicine, Houston, Tex.

[21] Appl. No.: 321,826

[22] Filed: Oct. 6, 1994

[51] Int. Cl.⁶ ................................................. B29D 31/00
[52] U.S. Cl. ........................... 264/163; 83/19; 83/176; 425/2; 264/DIG. 30
[58] Field of Search .................. 83/19, 21, 176; 264/138, 163, DIG. 30; 425/2

[56] References Cited

U.S. PATENT DOCUMENTS

| 3,186,271 | 6/1965 | Kaiser | 83/176 |
| 3,197,357 | 7/1965 | Schulpen | 83/176 |
| 3,381,076 | 4/1968 | Govatsos | 264/321 |
| 3,665,792 | 5/1972 | Bush et al. | 83/176 |
| 3,711,362 | 1/1973 | Ballard | 156/219 |
| 3,775,526 | 11/1973 | Gilmore | 264/156 |
| 3,830,896 | 8/1974 | Flicker et al. | 425/2 |
| 4,304,747 | 12/1981 | Lake | 264/156 |
| 4,332,633 | 6/1982 | Yamauchi et al. | 264/163 |
| 4,351,211 | 9/1982 | Azzolini | 83/176 |
| 4,485,295 | 11/1984 | Kellermeyer | 83/16 |
| 4,525,130 | 6/1985 | Netznik | 425/2 |
| 5,211,897 | 5/1993 | Albertelli et al. | 264/134 |
| 5,281,117 | 1/1994 | Hong | 249/155 |

FOREIGN PATENT DOCUMENTS

| 630726 | 11/1961 | Canada | 83/176 |
| 0222642 | 5/1987 | European Pat. Off. | 83/176 |
| 2050845 | 4/1972 | Germany | 83/176 |

Primary Examiner—Robert Davis
Attorney, Agent, or Firm—Fulbright & Jaworski

[57] ABSTRACT

A method and apparatus for making a custom resilient foam support for a human body from a foam block having first and second opposite sides. The method includes placing the first side of the foam against a plurality of individually adjusted supports which are movable towards the first side and placing a human body against the second side of the foam block. The supports are individually adjusted for compressing portions of the foam block for obtaining the desired support characteristics of the human body and cutting means cut the foam block along a plane between the supports and the body.

6 Claims, 2 Drawing Sheets

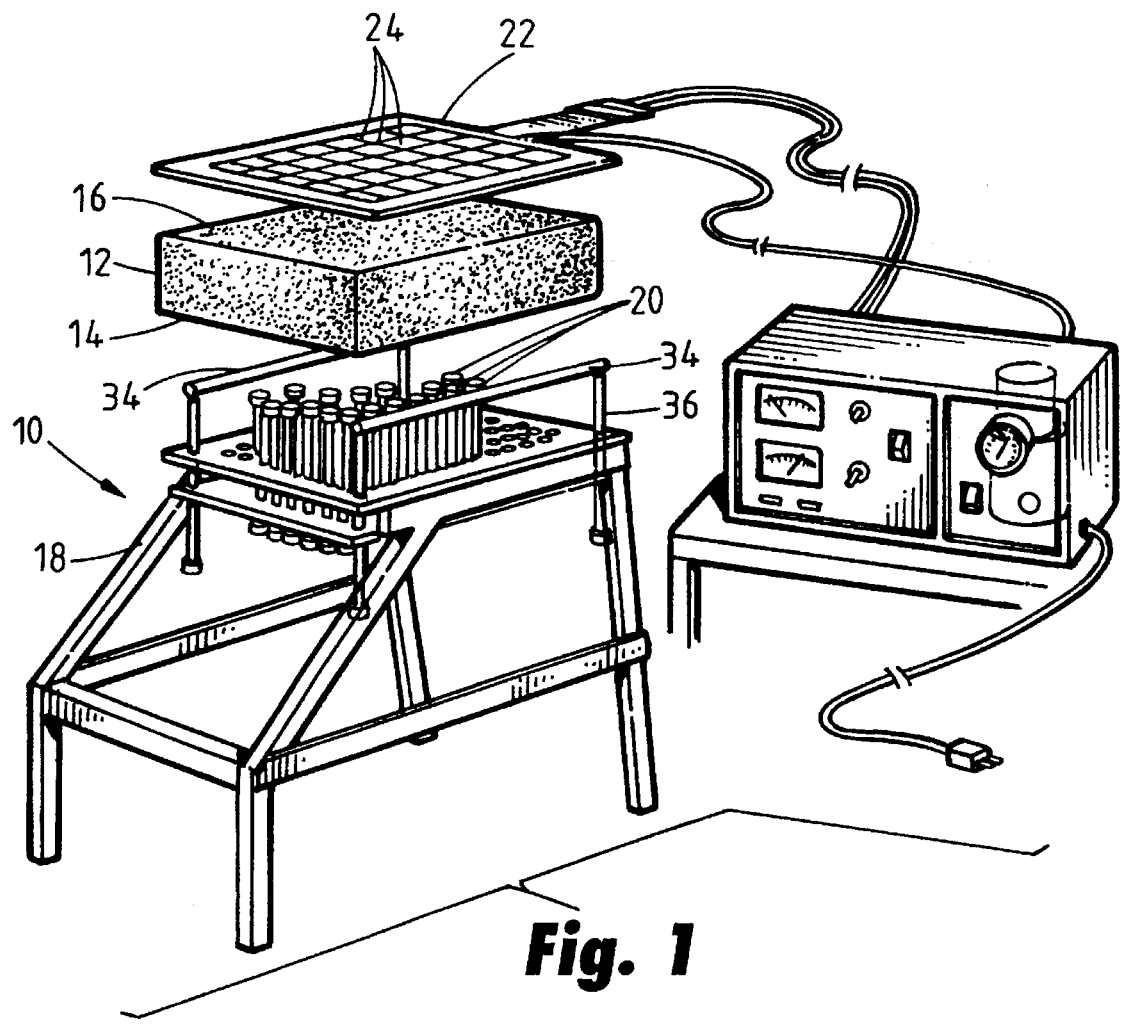
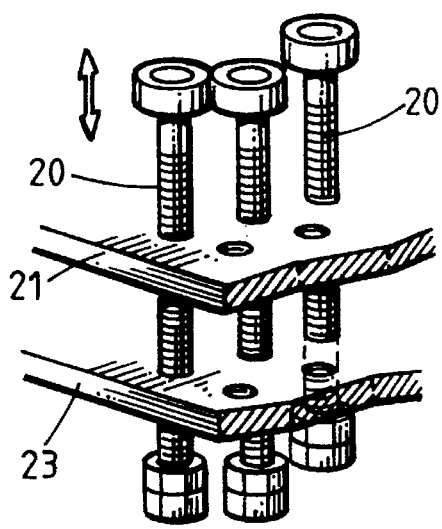
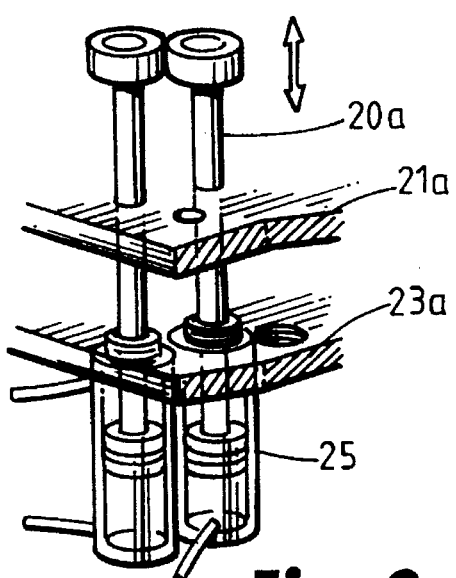

5,523,040

METHOD AND APPARATUS FOR MAKING A CUSTOM SUPPORT

BACKGROUND OF THE INVENTION

The present invention is directed to a method and apparatus for making a custom resilient foam support from a foam block for a human body.

It is desirable to create custom foam supports such as custom-shaped seating systems for people with skeletal deformities or for people who require supports to protect the body skin from excess pressure. For example, custom shaped seating systems are needed for severely involved cerebral palsied persons, muscular dystrophied persons, traumatic brain injured persons, and children with congenital defects that limit seating. In the past one method of providing custom-shaped seating systems is by molding. The present method and apparatus can be used to create a body support with desired pressure contours or desired posture controls by using a resilient foam support that has the advantages of (1) uses various density and stiffness foams to accommodate the needs of the person being fitted, (2) does not require the use of CNC cutting equipment, (3) permits the support to be made much quicker without exposing the person to toxic chemicals as is the case in foam in place systems, (4) chose how the support will perform before it is cut so the need for trial fittings is reduced, and (5) the person being fit does not have to have a plaster mold made.

SUMMARY

The present invention is directed to a method of making a custom-resilient foam support for human bodies from a foam block having first and second opposite sides and includes placing the first side of the foam block against a plurality of individually adjustable supports which are movable towards the first side, placing the human body against the second side of the foam block, individually adjusting the supports for compressing portions of the foam block for obtaining the desired support characteristics, and cutting the foam block along the plane between the supports and the body resulting in a foam support having the desired support characteristics.

Yet a further object of the present invention includes placing a pressure measuring transducer having a plurality of measuring devices between the human body and the second side of the block for measuring the pressure loading between the body and the block. The method includes adjusting the individual supports in response to the pressure measurements. In one embodiment the plurality of pressure measuring devices are substantially equal to the number of adjustable supports.

A still further object of the present invention is the provision of an apparatus for making a custom resilient foam support for a human body from a foam block having first and opposite sides including a base for receiving the foam block, a plurality of individually adjustable and extendable supports supported by the base and positioned perpendicular to the base for engaging the first side of the foam block for compressing the foam block when a body engages the second side of the block. The apparatus further includes cutting means for cutting along a plane between the first and second sides of the block.

Still a further object is the provision of an adjustable cutting means support connected to the base for guiding the cutting means.

A still further object is the provision of a pressure measuring transducer having a plurality of measuring devices for placing between the body and the second side of the block for measuring pressure between the body and the block. In one embodiment the measuring devices substantially equal the number of adjustable supports.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is a perspective, elevational view illustrating part of the apparatus of the present invention, FIG. 2 is an enlarged fragmentary perspective view illustrating the individually adjustable supports shown in FIG. 1, FIG. 3 is an enlarged fragmentary perspective view of another embodiment of individually adjustable supports.

DESCRIPTION OF THE PREFERRED EMBODIMENT

While the present invention will be described as making a custom shaped seat for a human body, for purposes of illustration only, it is to be recognized that the invention can be used to make other custom-resilient foam supports for a human body such as a seat back or a bed.

Figure 4:
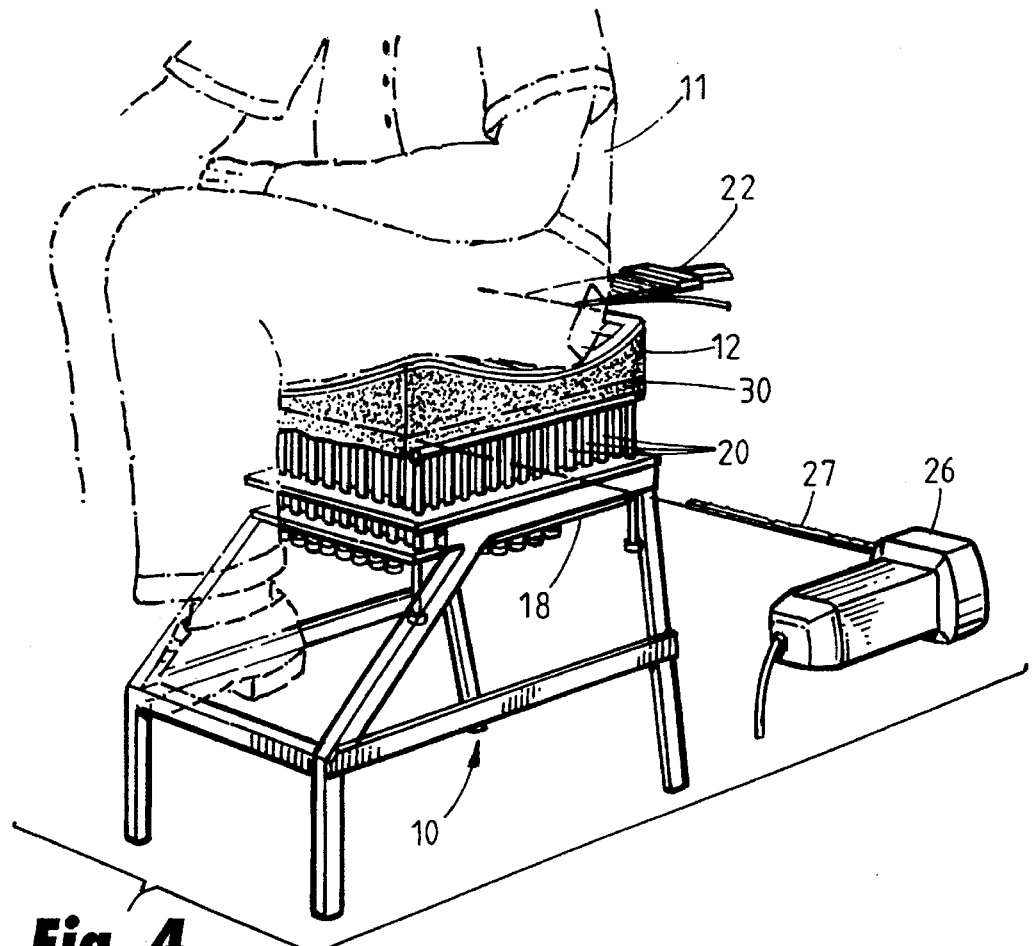
FIG. 4 is a fragmentary elevational perspective view illustrating the apparatus of the present invention and one step of the method.

Referring now to the drawings, and particularly to FIGS. 1 and 4, the reference numeral 10 generally indicates the apparatus of the present invention for making a custom-resilient foam support for a human body from a foam block 12 having first 14 and second 16 opposite sides. The apparatus 10 includes a base or frame 18 for receiving the foam block 12. A plurality or matrix of individually adjustable and extendable supports 20 are supported by the base 18 and positioned for perpendicularly engaging the first side 14 of the foam block 12 for compressing the block 12 when a person or body 11 engages the second side 16 of the block 12. In addition, a pressure measuring transducer 22 having a plurality of measuring devices 24 may be provided for placing between the body 11 and the second side 16 of the block 12 for measuring the pressure between the body 11 and the block 12. Suitable cutting means 26 is provided for cutting along a plane between the first side 14 and the second side 16 of the foam block 12.

Figure 5:
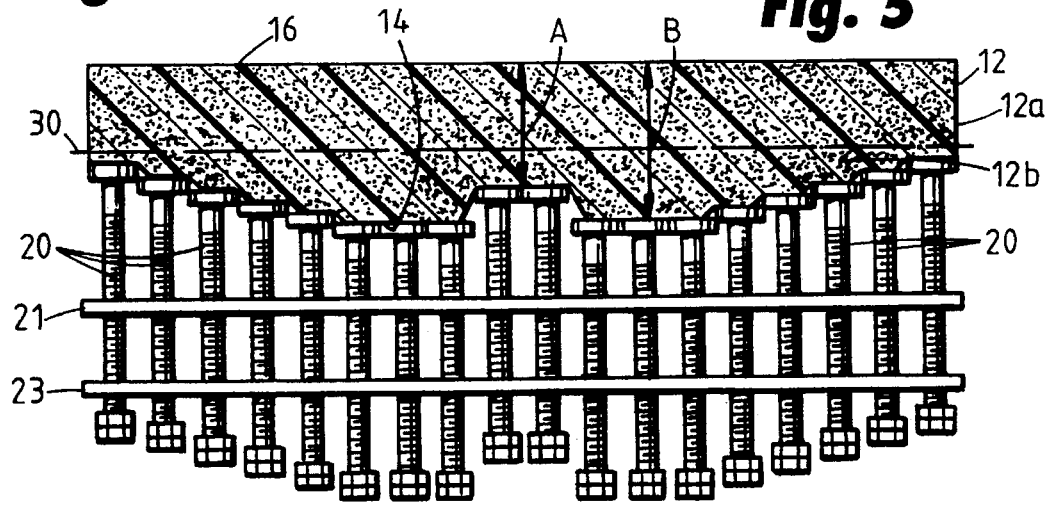
FIG. 5 is a cross-sectional view illustrating the adjustment of the individual adjustment supports for compressing portions of a foam block for obtaining desired support characteristics.
Figure 6:
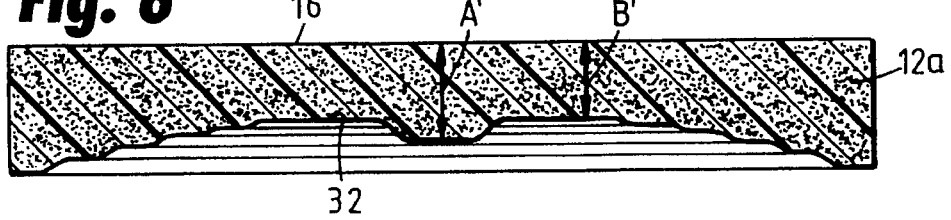
FIG. 6 is a cross-sectional view of the resilient foam support after it has been cut for providing the desired support characteristics.

Referring to FIGS. 1, 4 and 5, the foam block 12, which is the medium that is to be contoured and shaped, is positioned with its first side 14 engaging the tops of the plurality of individually adjustable and extendable supports 20 which can be longitudinally adjusted to contour the first side 14 of the foam block 12 with the person 11 seated on the second side 16 (with or without the pressure transducer 22). By adjusting the supports 20, the first side 14 may be adjusted to provide a contour to generate a seat that controls the pressure generated on the second side 16 against the bottom of the person 11 or controls the posture of the person 11 sitting on the second side 16. Thus, by compressing the foam 12 with the adjustable supports 20, the desired support characteristic can be obtained and the needed support is stored in the foam geometry as illustrated in FIG. 5. Then by using a cutting device 26 having a blade 27 for cutting along a plane 30 between the first and second sides 14 and 16, the foam block 12 is cut into a first piece 12a (FIG. 6) and a second piece 12b. The resulting shape of the portion 12a then forms the custom resilient foam support having a geometry needed to recreate the desired support characteristics. The now cut edge 32 can be fitted on a chair seat such as in a wheelchair or other base, covered with a wear cover (not shown), and the person 11 may now sit on the second side 16 and will experience the same support characteristics which were adjusted into the foam block 12 as set in FIG. 5. For example, the compressed thickness A in FIG. 5, results in a greater mass of foam being positioned in the top portion 12a of the block 12. After cutting along the line 30, the resilient expandable foam in the contour seat 12a will expand to provide the thickness A'. This thickness A' thus stores in the geometry the needed support when the person 11 is seated on the surface 16 of the foam portion 12a. On the other hand, thickness B in FIG. 5 which was not compressed as much as thickness A has more of its material removed by cutting along the line 30 which results in a smaller thickness B' in the contoured seat 12a with the resulting lesser support than thickness A.

The contoured support 12a can be made without the use of pressure transducer 22 particularly in the case where the posture of the person is being adjusted. However, the use of transducer 22 allows a more accurate determination of the pressure contact between the second side 16 of the foam block 12 and the person 11 and is particularly useful in making a support to protect the body skin from excess pressure. The pressure transducer preferably consists of a plurality of measuring devices 24, in which the measuring devices 24 substantially equal the number of adjustable supports 20 for more accurately adjusting the pressure contact on the person or body 11. Any suitable pressure transducer may be used. The interface pressure transducer 22 may be an interface pressure evaluator sold by Tee-Kay Applied Technology of Stafford, Tex.

The foam support 12 may be made of any suitable resilient type foam such as latex or polyurethane and the density and thickness may vary depending upon the person 11 and their particular problems. For example, the initial thickness of the foam 12 may be four inches and the cutting plane 30 may be approximately a quarter of an inch above the top of the highest support 20.

Referring now to FIG. 2, the pressure supports 20 may threadably extend through one or more frames 21 and 23 of the base 18 and thus may be longitudinally adjusted by rotatable action. In another embodiment (FIG. 3), the supports 20a may be longitudinally extended by a piston and cylinder assembly 25 through frames 21a and 23a, which may be hydraulically or air pressure controlled.

An adjustable cutting means support 34 is provided connected to the base or frame 18 for supporting the cutting blade 27 of the cutting means 26 for more accurately cutting along the plane 30. The adjustable cutting support 34 may be vertically adjusted relative to the base 18 by means of legs 34 which are threadably connected to the base 18 and pivotally connected to support 34.

In use, the resilient foam block 12 is placed on the top of the adjustable and extendable supports 20 and between the cutting means supports 34 and a pressure measuring transducer 22 is placed on the top side 16 and the person 11 to be fitted sits on top of the pressure transducer 22. Thereafter, the individual adjustable supports 20 are extended or retracted to adjust the contour or thickness of the block 12 at various locations to control the pressure generated on the person 11 or controlling the posture of the person 11 which may be in response to the pressure transducer 22. After adjustment, the needed support is thus stored in the foam block 12. Thereafter, by resting the blade 27 of the cutting means 26 on top of the cutting supports 34, a plane 30 is cut between the top of the plungers 20 and the person 11 to provide a contoured resilient body support 12a having the desired support characteristics to meet the requirements of the person 11.

The present invention, therefore, is well adapted to carry out the objects and attain the ends and advantages mentioned as well as others inherent therein. While a presently preferred embodiment of the invention has been given for the purpose of disclosure, numerous changes in the details of construction, arrangement of parts and steps of the method will readily suggest themselves to those skilled in the art and which are encompassed within the spirit of the invention and the scope of the appended claims.

What is claimed is:

1. A method of making a custom-resilient foam support for a human body from a foam block having first and second opposite sides, comprising, placing the first side of the foam block against a plurality of individually adjustable supports which are movable toward the first side, placing the human body against the second side of the foam block, individually adjusting the supports for compressing portions of the foam block for obtaining the desired support characteristics, and cutting the foam block along a plane between the supports and the body resulting in a foam support having the desired support characteristics.

2. The method of claim 1 including, placing a pressure measuring transducer having a plurality of measuring devices between the human body and the second side of the block for measuring the pressure loading between the body and the block.

3. The method of claim 2 wherein the individual supports are adjusted responsive to the pressure measurements.

4. The method of claim 2 wherein the plurality of measuring devices substantially equal the number of adjustable supports.

5. An apparatus for making a custom-resilient foam support for a human body from a foam block having first and second opposite sides, comprising, a base for receiving the foam block, a plurality of individually adjustable and extendable supports supported by the base and positioned for perpendicularly engaging the first side of the foam block for compressing the block when a body engages the second side of the block, cutting means for cutting along a plane between the first and second sides of the block, and a pressure measuring transducer having a plurality of measuring devices for placing between the body and the second side of the block for measuring the pressure between the body and the block.

6. The apparatus of claim 5 wherein the number of measuring devices substantially equal the number of adjustable supports.

* * * * *